United States Patent [19]

Fink

[11] 4,200,984
[45] May 6, 1980

[54] DETACHABLE TOOL COMBINING BRACKET AND METHOD

[76] Inventor: Ray D. Fink, R. D. #1, Box 419, York Haven, Pa. 17370

[21] Appl. No.: 19,451

[22] Filed: Mar. 12, 1979

[51] Int. Cl.$^2$ .......................... G01B 3/10; B43L 7/00
[52] U.S. Cl. ........................................ 33/138; 33/427
[58] Field of Search ..................... 33/137 B, 138, 173, 33/427

[56] References Cited

U.S. PATENT DOCUMENTS

| 501,774 | 7/1893 | Dunnington | 33/138 |
|---|---|---|---|
| 530,111 | 12/1894 | Krebs | 33/138 |
| 1,323,742 | 12/1919 | Burroughs | 33/138 |
| 1,690,919 | 11/1928 | Baine | 33/138 |
| 2,571,569 | 10/1951 | Greenwood | 33/138 |
| 2,731,989 | 1/1956 | Valcourt et al. | 33/138 |
| 2,964,848 | 12/1960 | Gonsalves | 33/138 |
| 3,095,651 | 7/1963 | Luedicke | 33/138 |
| 3,113,382 | 12/1963 | Lursen . | |
| 3,335,498 | 8/1967 | Barbee | 33/138 |
| 3,364,581 | 1/1968 | Andrews | 33/138 |
| 3,390,461 | 7/1968 | Anderson | 33/138 |
| 3,510,950 | 5/1970 | Andrews | 33/138 |

*Primary Examiner*—Steven L. Stephan
*Attorney, Agent, or Firm*—Samuel M. Learned, Jr.

[57] ABSTRACT

A detachable tool combining bracket and method for accomplishing the detachable affixment of a combination square and a tape measure such that the respective tools in combination relative one to the other, through employment of the combining bracket and method, thereby enables one to quickly and conveniently measure and mark off along the longitudinal edge of a workpiece equal or varying perpendicular lengths thereof, in either a right or left-hand use configuration of the tools in combination, and after the foregoing use application of the tools in combination enables the quick and convenient detachment of the combining bracket from each of the tools respectively such that each of the tools may thereupon be traditionally employed separately and unimpeded in other use applications when the combined use application thereof by way of the tool combining bracket is not called for.

4 Claims, 7 Drawing Figures

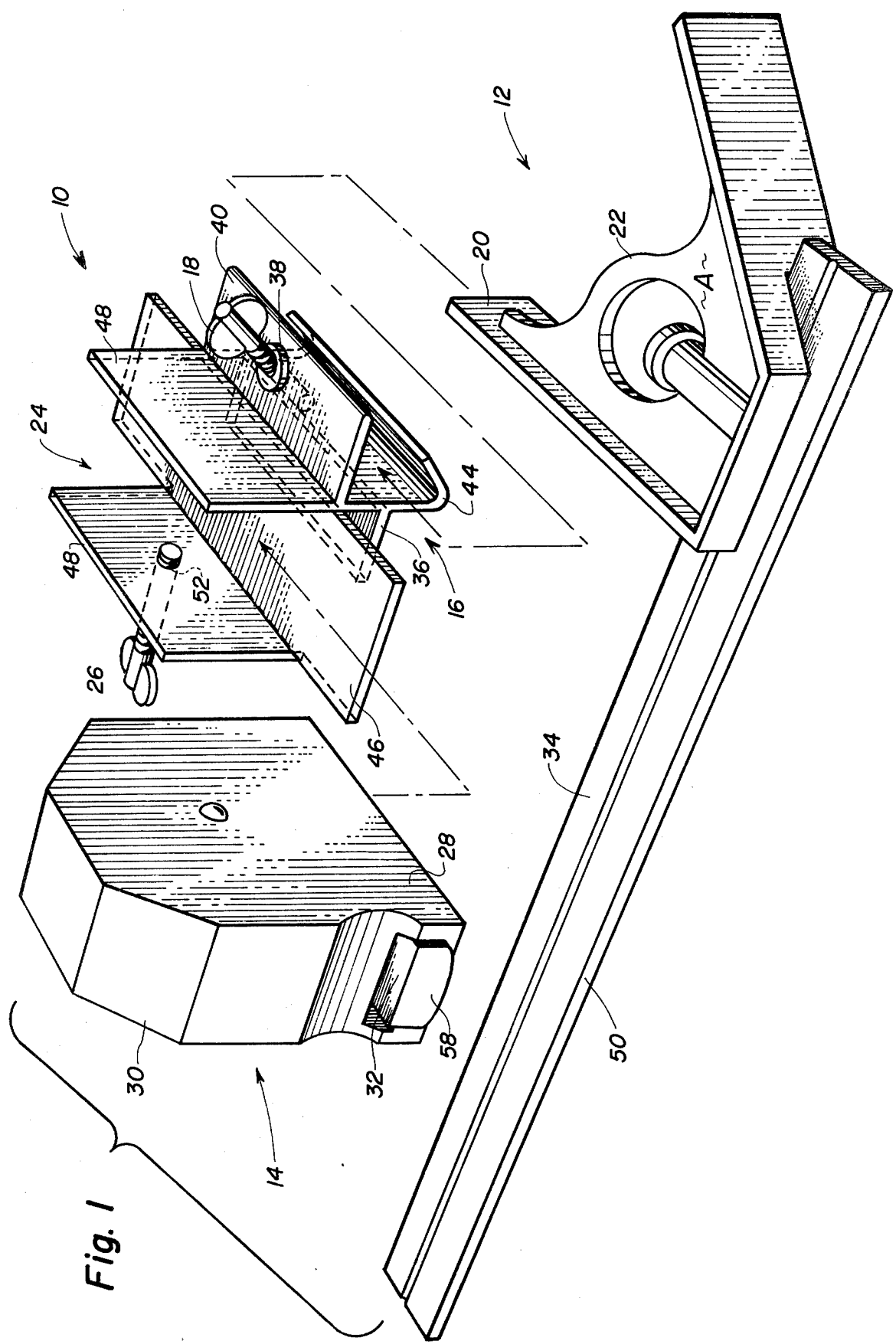

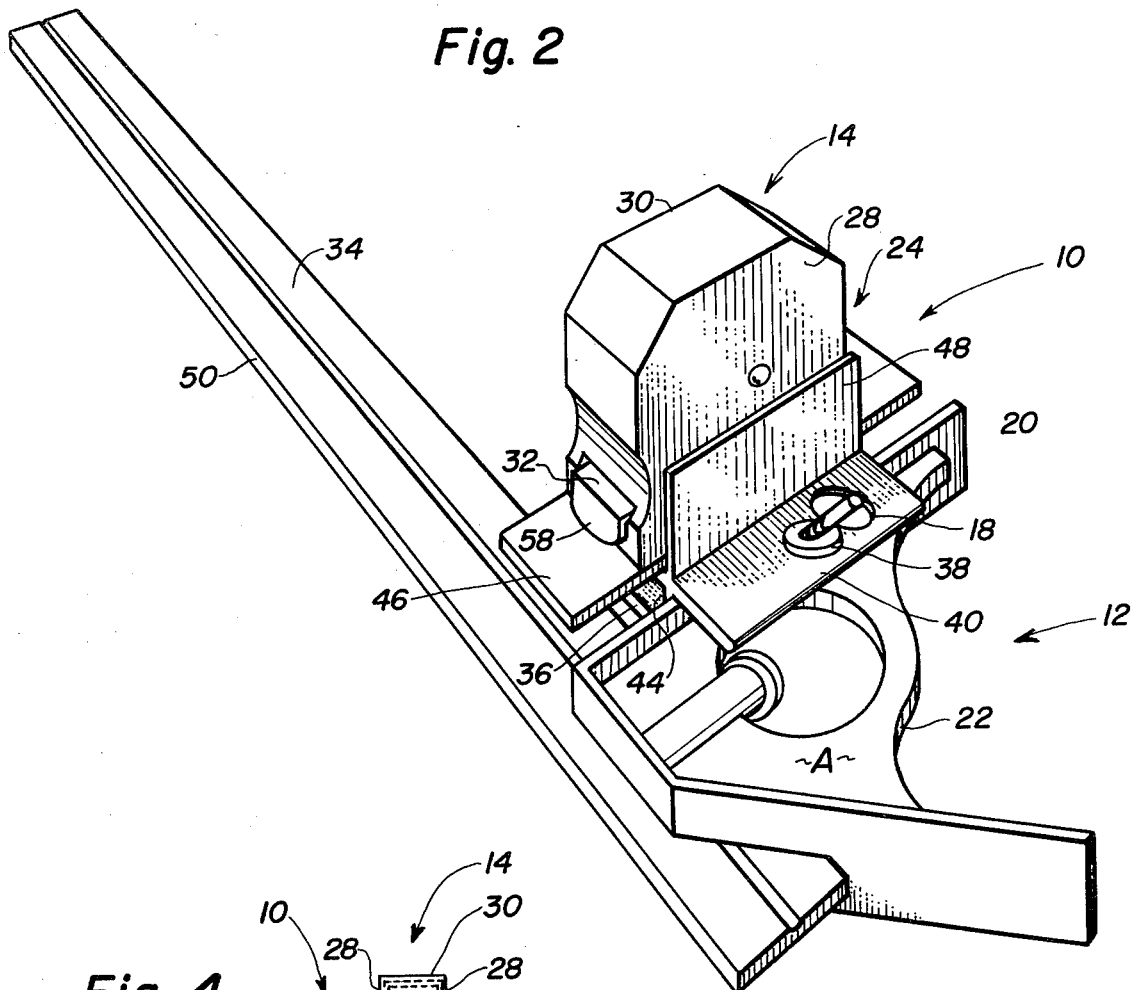

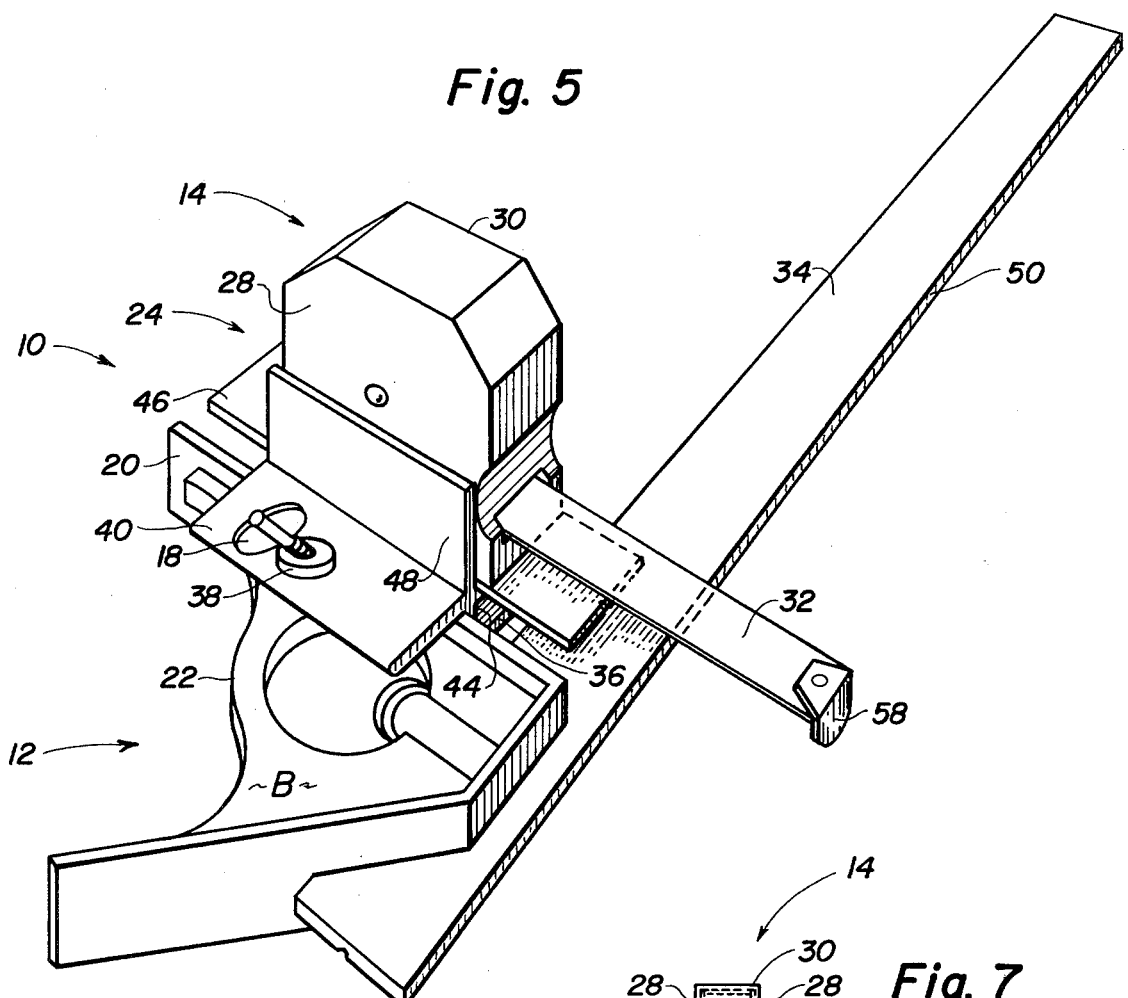
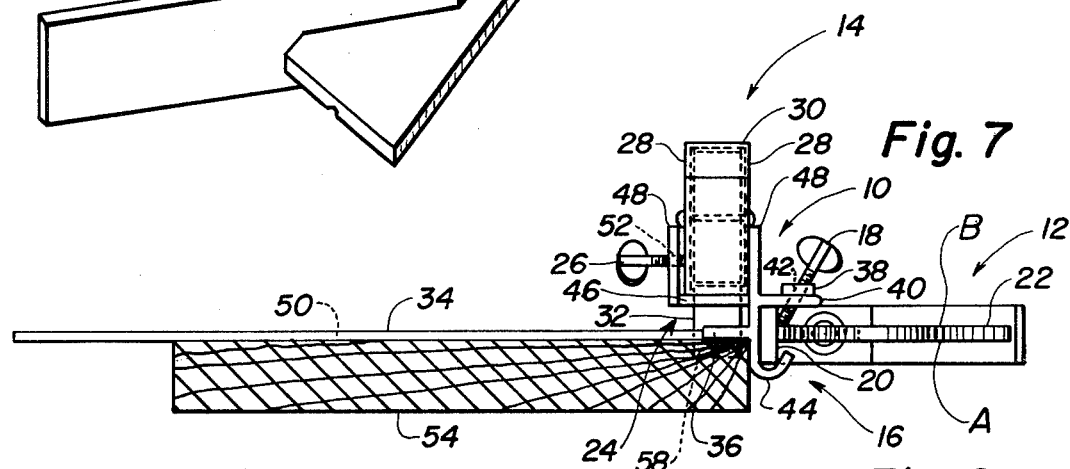
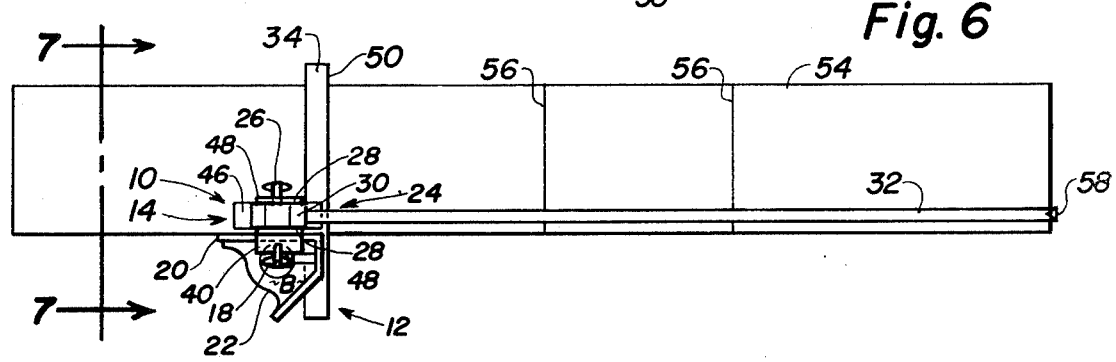

DETACHABLE TOOL COMBINING BRACKET AND METHOD

BACKGROUND OF THE INVENTION

The instant invention relates to a detachable tool combining bracket and method, whereby that means and method thus provided enables the detachable combining of a combination square tool and a tape measure tool, one each of said such tools, one to the other, in a relative spaced rule-perpendicular configuration respectively of said tools, thereby enabling a person to quickly and conveniently measure and mark off along the longitudinal edge of a workpiece equal or varying perpendicular lengths thereof, in either a right or left-hand use configuration of said tools in combination, after-which the respective tools may be quickly and conveniently detached from said tool combining bracket and the combination thereby accomplished, and thereupon be traditionally employed separately and unimpeded in other use applications when the combined use application thereof by way of the means and method of said tool combining bracket herein taught is not otherwise called for.

By way of definition at the outset, it is to be understood that the terms right-hand and left-hand use application of the subject tools in combination by way of the means and method of said detachable tool combining bracket is primarily in reference to the use application of said tools in combination with relative orientation respect in the utilization thereof upon a workpiece, either for purposes of user convenience or necessity such as when one end of a workpiece is obstructed by a wall or the like, or otherwise, and not per se necessarily to the right or left-hand predominance of a particular individual user thereof.

Various combinations of squaring device tools and tape measure tools are taught by the prior art, the most pertinent of which in view of the instant disclosure would be those most appropriately classified as being removable combinations of a tape measure with a square wherein the affixment means is integral to the square structure and does not thereby provide the versatility of both right and left-hand use application, exemplary of which would be those teachings as set forth respectively in U.S. Pat. No. 1,690,919 to Baine, dated Nov. 6, 1928; U.S. Pat. No. 2,571,569 to Greenwood, dated Oct. 16, 1951; and U.S. Pat. No. 3,113,382 to Lursen, dated Dec. 10, 1963.

A second classification of squaring device tool and tape measure tool combinations are set forth in those prior art disclosures teaching a fixed combination of the respective tools, by appropriate securement means, thereby not enabling the versatility of separate and unimpeded use application of the respective tools separately when the combination thereof is not called for, exemplary of which would be those teachings as set forth in U.S. Pat. No. 3,364,581 to Andrews, dated Jan. 23, 1968, and U.S. Pat. No. 3,510,950 also to Andrews, dated May 12, 1970.

With respect to the combining bracket means disclosed by the instant invention, certain other bracket means have been heretofore taught which provide similar functional purposes in the removable combination of a tape measure tool with a squaring or gage device, but said bracket means are otherwise structurally distinguished, as seen respectively in U.S. Pat. No. 2,731,989 to Valcourt et al, dated Jan. 24, 1956, and U.S. Pat. No. 3,095,651 to Luedicke, Jr., dated July 2, 1963.

Various other squaring device tool and tape measure tool combinations, collateral to the instant invention, are also shown in the prior art, being either cutting guide teachings as set forth respectively in U.S. Pat. No. 2,964,848 to Gonsalves, dated Dec. 20, 1960, and U.S. Pat. No. 3,390,461 to Anderson, dated July 2, 1968, or other squaring device tool and tape measure tool fixed combination teachings which provide functionally limited measurement and marking use application when compared to the utility features of the instant invention, being respectively as set forth in U.S. Pat. No. 501,774 to Dunnington, dated July 18, 1893; U.S. Pat. No. 530,111 to Krebs, dated Dec. 4, 1894; U.S. Pat. No. 1,323,742 to Burroughs, dated Dec. 2, 1919; and U.S. Pat. No. 3,335,498 to Barbee, dated Aug. 15, 1967.

It should be understood that some of the features of the instant invention have, in some cases, certain structural and functional similarities to teachings separately set forth in the prior art disclosures heretofore cited and briefly discussed. However, as will hereinafter be pointed out, the instant invention is distinguishable from said earlier inventions in one or more ways in that the present invention has utility features and new and useful advantages, applications, and improvements in the art of detachable tool combining brackets and methods, as applied to the combination of squaring device and tape measure tools, not heretofore known.

SUMMARY OF THE INVENTION

It is the principal object of the present invention to provide a detachable tool combining bracket comprised of two integrally formed channel members respectively adapted to receive and be compressively communicated in detachable affixment by thumbscrew means, first to the right angle segment of the adjustable head element of a combination square, and second to the laterally disposed external side surfaces of a tape measure housing, such that the rule of the tape measure is extendible perpendicular to the rectilinear external edge of the rule segment of said combination square, whereby the aforesaid combination square and tape measure tools thus secured one to the other in the relative spaced configuration of one to the other as above described thereby enables one to quickly and conveniently measure and mark off on a workpiece a successive plurality of either equal or varying lengths thereof perpendicular to the longitudinal edge of said workpiece in but a single measurement operation.

It is another object of the present invention to provide a detachable tool combining further embodying integral thereto a depending balance and guide flange configured parallel to the inside rectilinear edge of the right angle segment of the adjustable head element of said combination square, such that the respective tools in combination, by means of said tool combining bracket, will be self-supporting when in unattended placement upon and along the longitudinal edge of a workpiece, in addition to said flange providing a perpendicular guide means for the rectilinear external edge of the rule segment of said combination square when said tools in combination are displaced in measurement-/marking use along the longitudinal edge of said workpiece.

It is a further object of the present invention to provide a detachable tool combining bracket which may be quickly and conveniently detached from affixment to each of said tools, that is, the adjustable head element of the combination square and tape measure housing, such that each of said tools may be traditionally employed separately and unimpeded in other use applications when the combined use application thereof by means of said tool combining bracket is not called for.

Still another object of the present invention is to provide a detachable tool combining bracket which may be employed to affix a combination square and tape measure in detachable combination, one tool relative to the other, in either a right or left-handed measurement-/marking use configuration.

It is yet another object of the present invention to provide a detachable tool combining method whereby a combination square and tape measure may be combined, in detachable affixment, one to the other, such that the same are thereby adapted to provide the quick and convenient capability for measuring and marking off on a workpiece a successive plurality of either equal or varying lengths thereof perpendicular to the longitudinal edge of said workpiece in but a single measurement operation, in either a right or left-handed measurement-/marking use configuration of said tools in combination, or alternately enable detachment of the respective tools one from the other such that the same may be employed separately and unimpeded in other use applications when the combined use application thereof by means of said method is not called for.

Details of the foregoing objects and the invention, as well as other objects thereof are set forth in the following specification and illustrated in the accompanying drawings comprising a part thereof.

BRIEF DESCRIPTION OF THE DRAWINGS

FIG. 1 is an exploded perspective view of the detachable tool combining bracket comprising the instant invention, the same being shown in spaced oriented combination association with an exemplary combination square and an exemplary tape measure.

FIG. 2 is a perspective view showing the right-hand use application assembly combination of said exemplary combination square and exemplary tape measure by the means and method of employing and embodying said detachable tool combining bracket.

FIG. 3 is a plan view of the tool combination illustrated in FIG. 2 as the same would appear when being utilized upon an exemplary longitudinal workpiece in the right-hand use application for purposes of accomplishing measurement and dimension mark off longitudinally perpendicular therealong with respect thereto.

FIG. 4 is an enlarged sectional elevation of the tool combining bracket right-hand use application shown in FIG. 3 as seen along the line 4—4 thereof.

FIG. 5 is a perspective view showing the left-hand use application assembly combination of said exemplary combination square and exemplary tape measure by the means and method of employing and embodying said detachable tool combining bracket.

FIG. 6 is a plan view of the tool combination illustrated in FIG. 5 as the same would appear when being utilized upon an exemplary longitudinal workpiece in the left-hand use application for purposes of accomplishing measurement and dimension mark off longitudinally perpendicular therealong with respect thereto.

FIG. 7 is an enlarged sectional elevation of the tool combining bracket left-hand use application shown in FIG. 6 as seen along the line 7—7 thereof.

DETAILED DESCRIPTION OF THE INVENTION

Referring to FIG. 1, the present invention is shown which comprises a detachable tool combining bracket 10 support frame adapted to combine a combination square tool 12 and a tape measure tool 14 in a spaced relationship, one to the other, such that said combination square and tape measure tools may be employed together for purposes of quickly and conveniently measuring and marking off along a longitudinal workpiece equal or varying dimensions perpendicular thereto, in either a right or left-hand combined use application configuration thereof (to be more fully detailed in subsequent description of FIGS. 2 through 7 hereof), said bracket 10 further comprising a first integrally formed channel member 16 provided with a first thumbscrew 18 adapted respectively to slidably receive and compressively retain in detachable affixment the combination square adjustable head element right angle segment 20 of the adjustable head element 22 of said combination square 12 and a second integrally formed channel member 24 provided with a second thumbscrew 26 adapted respectively to slidably receive and compressively retain in detachable affixment the tape measure housing laterally disposed external side surfaces 28 of the tape measure housing 30 of said tape measure 14 whereby the same is disposed in fixed spaced relationship to said combination square 12 such that the tape measure rule 32 may be retractably extended perpendicular to the combination square rule 34, and said bracket 10 further including a depending balance and guide flange 36 which enables the tools in combination by means of said bracket 10 to maintain self-supporting placement without attendance in use application upon a workpiece and also be guidably positioned in displaced movement therealong in use application. Also shown in FIG. 1 is a first thumbscrew boss 38, formed integral to the upwardly disposed laterally projecting flange 40 of said first integrally formed channel member 16, whereby additional compressive retention support is obtained with respect to detachable affixment of said combination square adjustable head element right angle segment 20 therein by means of said first thumbscrew 18.

The view shown in FIG. 1 additionally illustrates a detached configuration of the combination square tool 12 and tape measure tool 14 from said bracket 10, thereby enabling respectively traditional and unimpeded use applications of said tools 12 and 14 separate and apart from the combined use application configurations thereof, said detached configuration being also as taught herein with respect to said bracket 10 and the detachable feature utility thereof relating to that method pertaining thereto as also herein taught.

Referring now to FIGS. 2 through 4 inclusive, wherein it is presumed that a right-hand use application of the aforementioned tool 12 and 14 combination through employment of said bracket 10 is desired in accomplishing measurement and dimension mark off functions upon a workpiece longitudinally perpendicular therealong with respect thereto, wherein it is further presumed, either as a consequence of utilization circumstances such as in the event of an obstruction or the like at one end of the workpiece to be marked upon, or a right-hand predominance of the particular individual user, a right-hand use application combination assembly of said tools 12 and 14 by means of said bracket 10 is required. As illustrated respectively in FIG. 1, and FIGS. 2 through 4, a right-hand use application and method for employment of said bracket 10 is obtained by slidable assembly of the combination square adjustable head element right angle segment 20 within the first integrally formed channel member 16, with side A of the adjustable head element 22 of said combination square tool 12 facing upward as shown in said aforementioned Figure illustrations 1 through 4, whereupon said combination square adjustable head element right angle segment 20 is compressively secured in detachable affixment within said first integrally formed channel member 16 through threadably compressive engagement therewith by means of said first thumbscrew 18 threadably communicating through boss 38 and first threaded opening 42 such that said adjustable head element right angle segment 20 is thereby caused to be compressively counter-engaged by the downward facing surface of the upwardly disposed laterally projecting flange 40 and downwardly depending J-shaped flange 44 comprising in combination said first integrally formed channel member 16, as seen in part of FIG. 2 but more particularly illustrated in FIG. 3. Next, the tape measure tool 14 is slidably assembled within the second integrally formed channel member 24, comprised of a tape measure housing base support plate 46 which is provided with upward projecting tape measure housing laterally disposed external side surface channel flanges 48 integrally perpendicular thereto, such that the tape measure rule 32 is retractably extendible in spaced perpendicular relationship to and away from the rectilinear external edge 50 of the combination square rule 34, whereupon said tape measure tool 14 is compressively secured in detachable affixment within said second integrally formed channel member 24 through threadably compressive engagement therewith by means of said second thumbscrew 26 threadably communicating through a second threaded opening 52 such that said tape measure housing laterally disposed external side surface opposite said second thumbscrew 26 is thereby caused to be compressively counter-engaged by the upward projecting tape measure housing laterally disposed external side surface channel flange 48 inward facing opposite side surface. With the respective tools 12 and 14 assembled in combination by the means and method of said detachable tool combining bracket 10 as above-described, the same are thereupon readied for right-hand measuring and marking use application as further illustrated in FIGS. 3 and 4 hereinafter.

Referring now to FIGS. 3 and 4 wherein is illustrated the right-hand use application of said tools 12 and 14 assembled in spaced relationship, one to the other, by means of said bracket 10, as pertains to the measurement and marking of a workpiece 54, showing in FIG. 4 particularly the unattended self-supporting balance placement of said tools in combination upon said workpiece 54 by means of the depending balance and guide flange 36 of said bracket 10 as seen in enlarged end sectional elevation taken from along the line 4—4 of FIG. 3.

The view shown in FIG. 3 illustrates the manner of employment of said tools 12 and 14 in spaced relationship combination by means of said bracket 10 for purposes of right-hand use application in measuring and marking off along the longitudinal edge of a workpiece 54 equal or varying perpendicular lengths 56 thereof, wherein the tape measure rule keeper 58 is engaged at one end of said workpiece 54 and the tape measure rule 32 extended longitudinally with respect thereto in bracket 10 detachable affixment with said combination square tool 12, with the rule 34 thereof being perpendicularly reference oriented with respect to the longitudinal edge of said workpiece 54 while guided in tape measure rule 32 extension displacement therealong by the depending balance and guide flange 36 of said bracket 10, such that the rectilinear external edge of the combination square rule 50 corresponds to the desired perpendicular length 56 as indicated by said tape measure rule 32, whereupon a perpendicular length 56 line is marked upon said workpiece 54, with the foregoing procedure repeated as many times as is thereafter necessary to accomplish the desired number of equal or varying perpendicular length 56 measurement marking dimension lines upon said workpiece 54.

The detachable tool combining bracket 10 as herein disclosed and described is preferably cast-constructed from metal, however, any other suitable materials such as plastics or the like, or combinations thereof, may be used.

Referring now to FIGS. 5 through 7 inclusive, wherein it is presumed that a left-hand use application of the aforementioned tool 12 and 14 combination through employment of said bracket 10 is desired in accomplishing measurement and dimension mark off functions likewise upon a workpiece 54 longitudinally perpendicular therealong with respect thereto, wherein it is further presumed, either as a consequence of utilization circumstances such as in the event of an obstruction or the like at one end of the workpiece 54 to be marked upon, or a left-hand predominance of the particular individual user, a left-hand use application combination assembly of said tools 12 and 14 by means of said bracket 10 is required. As illustrated respectively in FIGS. 5 through 7, a left-hand use application and method for employment of said bracket 10 is obtained by slidable assembly of the combination square adjustable head element right angle segment 20 within the first integrally formed channel member 16, with side B of the adjustable head element 22 however, said side B being the side opposite side A thereof as previously illustrated, of said combination square tool 12 facing upward as shown in said aforementioned Figure illustrations 5 through 7, whereupon the remaining detachable affixment procedure for both the combination square tool 12 and tape measure tool 14, in fixed spaced relationship, one to the other, by employment of the means and method of said bracket 10, is identical to that as previously described in detachable assembly thereof for right-hand use application in accomplishing measurement and marking functions upon a workpiece 54, which assembly for the left-hand use application configuration is specifically illustrated in FIGS. 5 and 7 hereof.

The view shown in FIG. 6 illustrates the manner of employment of said tools 12 and 14 in spaced relationship combination by means of said bracket 10 for purposes of left-hand use application in measuring and marking off along the longitudinal edge of a workpiece 54 equal or varying perpendicular lengths 56 thereof, wherein the tape measure rule keeper 58 is engaged at the opposite end of previously said one end of said workpiece 54 and the tape measure rule 32 extended longitudinally with respect thereto in bracket 10 detachable affixment with said combination square tool 12, with the rule 34 thereof being perpendicularly reference oriented with respect to the longitudinal edge of said workpiece 54 while guided in tape measure rule 32 extension displacement therealong by the depending balance and guide flange 36 of said bracket 10, such that the rectilinear external edge of the combination square rule 50 corresponds to the desired perpendicular length 56 as indicated by said tape measure rule 32, whereupon a perpendicular length 56 is marked upon said workpiece 54, with the foregoing procedure repeated as many times as is thereafter necessary to accomplish the desired number of equal or varying perpendicular length 56 measurement marking dimension lines upon said workpiece 54.

Upon completion of accomplishing measurement and marking functions as above-described, in either the right or left-hand use configuration of said tools 12 and 14 in detachably fixed spaced relationship combination, one to the other, through employment of the means and method of said bracket 10, said tools 12 and 14 may thereafter be detached from said bracket 10 and thereupon separately employed, unimpeded, in traditional use applications thereof, being an additional feature of said bracket 10 as previously described in reference to the FIG. 1 illustration hereof.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

I claim:

1. A detachable tool combining bracket to interchangeably assemble in a relative right-hand or alternately a left-hand use application combined fixed spaced relationship of one to the other a combination square tool and a tape measure tool such that a tape measure rule of said tape measure tool is disposed to be retractibly extended perpendicularly away of the rectilinear external edge of a square rule of said combination square tool thereby enabling the quick and efficient accomplishment of measurement and marking off along a longitudinal workpiece at least one longitudinal dimension thereof perpendicular thereto, said bracket comprising in combination:
   a. a support frame having interconnected horizontal and vertical members,
   b. a first integrally formed channel member of said support frame adapted to receive and detachably retain therein by a first compressive means an adjustable head element right angle segment of said combination square tool,
   c. a second integrally formed channel member of said support frame adapted to receive and detachably retain therein by a second compressive means a tape measure housing of said tape measure tool, and
   d. means to respectively effect self-supporting unattended balance upon said longitudinal workpiece, and longitudinally guide therealong, said combination square tool during extension of said tape measure rule in the accomplishment of perpendicular dimension measurement and marking functions being respectively an upwardly disposed laterally projecting flange integral to said support frame adapted to supportively engage the upward disposed surface of said longitudinal workpiece and a downwardly disposed flange integral to said support frame and communicating perpendicularly of said upwardly disposed laterally projecting flange to form a recessed right-angle configuration therewith adapted to cooperatively communicate with the longitudinally disposed outward projecting right-angle juncture surfaces of said longitudinal work-piece during measurement and marking displacement longitudinally thereof.

2. The bracket according to claim 1 in which said first compressive means is a first thumbscrew.

3. The bracket according to claim 1 in which said second compressive means is a second thumbscrew.

4. The bracket according to claim 1 in which said combination square tool and said tape measure tool respectively are detachably removed therefrom.

* * * * *